United States Patent [19]
Lundberg et al.

[11] Patent Number: 5,743,785
[45] Date of Patent: Apr. 28, 1998

[54] POLISHING METHOD AND APPARATUS FOR PREFERENTIALLY ETCHING A FERRULE ASSEMBLY AND FERRULE ASSEMBLY PRODUCED THEREBY

[75] Inventors: Jeffrey C. Lundberg, Lenoir; Donald Lee Knasel; Toshiaki Satake, both of Hickory, all of N.C.

[73] Assignee: US Conec Ltd., Hickory, N.C.

[21] Appl. No.: 628,218

[22] Filed: Apr. 4, 1996

[51] Int. Cl.⁶ .................................................. B24B 1/00
[52] U.S. Cl. .......................... 451/28; 451/41; 451/270; 451/271
[58] Field of Search ................... 451/41, 28, 271, 451/270, 278, 357, 163, 166, 167, 276, 279, 390, 366, 396, 363, 259, 285, 287

[56] References Cited

U.S. PATENT DOCUMENTS

| | | |
|---|---|---|
| 2,554,701 | 5/1951 | Hackett et al. |
| 2,796,702 | 6/1957 | Bodine, Jr. |
| 2,804,724 | 9/1957 | Thatcher |
| 3,061,422 | 10/1962 | Sato |
| 3,496,677 | 2/1970 | Bodine |
| 3,535,159 | 10/1970 | Shiro |
| 3,564,775 | 2/1971 | Bodine |
| 3,589,071 | 6/1971 | Hirschborn |
| 3,596,407 | 8/1971 | McKinney |
| 3,715,842 | 2/1973 | Tredinnick et al. |
| 3,753,322 | 8/1973 | Bordes |

(List continued on next page.)

FOREIGN PATENT DOCUMENTS 2103919   5/1980   Germany.

OTHER PUBLICATIONS

Ultra Tec Fiber Optic Products catalog, Jun. 15, 1985.
Zimin, Savel'ev and Chutko, *Use of ultrasonic processing for the fabrication of optical components having a complicated surface shape*, Sov. J. Opt. Technol. 53, Jan. 1986, pp. 55–56.
Moore, *Uses of ultrasonic impact grinding (UIG) in optical fabrication*, SPIE vol. 966 Advances in Fabrication and Metrology for Optics and Large Optics, 1988, pp. 122–127.
Tesar, Fuchs and Hed, *Examination of the polished surface character of fused silica*, Applied Optics, vol. 31, No. 34, Dec. 1, 1992, pp. 7164–7172.
Totoku Electric Co., Ltd. catalog, *Totoku 8°APC*, 1994.
Chen, Marom and Lee, *Geodesic lenses in single–mode $LiNbO_3$ waveguides*, Applied Physics Letters, vol. 31, No. 4, Aug. 15, 1977.
Zimin, *Investigation of the technological process of ultrasonic finishing of polished surfaces of optical elements*, Sov. J. Opt. Technol. 57, May 1990, pp. 309–311.
Doughty, DeLaRue, Finlayson, Singh and Smith, *Integrated optical microwave spectrum analyser (IOSA) using geodesic lenses*, SPIE, vol. 369 Max Born, pp. 705–710.

Primary Examiner—Timothy V. Eley
Assistant Examiner—Derris Banks

[57] ABSTRACT

The method and associated apparatus of the present invention polishes the front face of a ferrule with first and second slurries such that an end portion of each optical fiber which extends through and is held by the ferrule protrudes beyond the preferentially etched front face of the ferrule by a preselected length. In order to preferentially etch the front face of ferrule as desired, the front face of the ferrule is polished with a first slurry having a plurality of suspended particulates of a first predetermined size on average which initiates the preferential etch of the ferrule relative to the optical fibers. Thereafter, the front face of the ferrule is polished with a second slurry having a plurality of suspended particles of a second predetermined size on average. The slurries are preferably selected such that the second predetermined size is less than the first predetermined size so that the polishing of the front face of the ferrule with the second slurry completes the preferential etch of the ferrule relative to the optical fibers. By preferentially etching the front face of the ferrule relative to the optical fibers, the optical fibers will protrude beyond the front face of the ferrule by a preselected length which does not vary significantly from fiber to fiber.

23 Claims, 6 Drawing Sheets

U.S. PATENT DOCUMENTS

| | | | |
|---|---|---|---|
| 3,922,393 | 11/1975 | Sears, Jr. | |
| 4,022,625 | 5/1977 | Shelton | |
| 4,057,939 | 11/1977 | Basi | |
| 4,218,849 | 8/1980 | Bodine | |
| 4,291,502 | 9/1981 | Grimsby et al. | |
| 4,693,035 | 9/1987 | Doyle | |
| 4,823,513 | 4/1989 | Marcus et al. | |
| 4,831,784 | 5/1989 | Takahshi | |
| 4,863,523 | 9/1989 | Meffert et al. | |
| 4,905,415 | 3/1990 | Moulin | |
| 4,979,334 | 12/1990 | Takahashi | |
| 5,040,336 | 8/1991 | Ahern | |
| 5,078,801 | 1/1992 | Malik | |
| 5,136,820 | 8/1992 | Luther | |
| 5,140,660 | 8/1992 | Takahashi | |
| 5,214,730 | 5/1993 | Nagasawa et al. | |
| 5,216,846 | 6/1993 | Takahashi | 451/278 |
| 5,226,101 | 7/1993 | Szentesi et al. | |
| 5,245,684 | 9/1993 | Terao et al. | |
| 5,264,010 | 11/1993 | Brancaleoni et al. | |
| 5,351,327 | 9/1994 | Lurie et al. | |
| 5,516,328 | 5/1996 | Kawada | 451/271 |
| 5,547,418 | 8/1996 | Takahashi | 451/278 |
| 5,556,323 | 9/1996 | Luther et al. | 451/28 |
| 5,601,474 | 2/1997 | Takahashi | 451/271 |

POLISHING METHOD AND APPARATUS FOR PREFERENTIALLY ETCHING A FERRULE ASSEMBLY AND FERRULE ASSEMBLY PRODUCED THEREBY

FIELD OF THE INVENTION

The present invention relates generally to methods and apparatus for polishing ferrule assemblies and, more particularly, to methods and apparatus for preferentially etching a ferrule relative to an optical fiber which extends therethrough.

BACKGROUND OF THE INVENTION

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home or, in some instances, directly to a desk or other work location.

With the ever increasing and varied use of optical fibers, it is apparent that efficient methods of coupling optical fibers, such as to other optical fibers, are required. Accordingly, a variety of standardized fiber optic connectors have been developed which can be mounted to end portions of one or more optical fibers to facilitate connection and coupling of the optical fibers. For example, standardized multi-fiber connectors have been developed which can be mounted to end portions of a pair of fiber optic cables, each of which can include a number of individual optical fibers. The fiber optic connectors can then be interconnected in a predetermined aligned relationship.

By way of example, MT fiber optic connectors have been developed, one embodiment of which is illustrated and described in U.S. Pat. No. 5,214,730 which issued May 25, 1993 to Shinji Nagasawa et al. and is assigned to Nippon Telegraph and Telephone Corporation. As illustrated in the Nagasawa '730 patent, the fiber optic connector receives a fiber optic ribbon cable having a plurality of individual optical fibers and maintains the individual optical fibers in a predetermined aligned relationship. Accordingly, the fiber optic connector can be mated with a corresponding fiber optic connector so as to align the plurality of individual optical fibers of the fiber optic connector with the plurality of optical fibers of the fiber optic cable received by the corresponding fiber optic connector.

During fabrication, fiber optic connectors, such as fiber optic connectors which align and interconnect a single optical fiber, are polished in order to polish the front face of the fiber optic connector and the end portion of the optical fiber. By polishing the fiber optic connector, the transmission efficiency of the fiber optic connector is typically increased. In order to polish the fiber optic connector, the fiber optic connector is typically mounted within a polishing apparatus, such as described by U.S. Pat. No. 4,979,334 issued Dec. 25, 1990 to Mitsuo Takahashi and assigned to Seikoh Giken Co., Ltd., the contents of which are incorporated herein by reference. As described by the Takahashi '334 patent, the fiber optic connector is held by an optical fiber holder section of the polishing apparatus in facing relation to a polishing disc. By thereafter rotating the polishing disc, the front face of the ferrule and an end portion of the optical fibers are polished. While the polishing apparatus of the Takahashi '334 patent can adequately polish the end portion of a single optical fiber, it is increasingly difficult to polish multi-fiber connectors which include a plurality of optical fibers, as explained hereinafter.

In order to further increase the efficiency with which signals are coupled between optical fibers, the fiber optic connectors preferably maintain the end portions of the respective optical fibers of the pair of fiber optic cables in physical contact or, at a minimum, maintain the spacing between the end portions of the respective optical fibers as small as possible. By maintaining physical contact or a small spacing between the end portions of the respective optical fibers, the percentage of the optical signals which is lost due to scattering, reflections, attenuation or other losses is minimized.

As known to those skilled in the art, a fiber optic connector includes a ferrule having a number of openings through which one or more optical fibers extend. To facilitate contact between the optical fibers of a pair of fiber optic connectors, the optical fibers preferably protrude beyond the front face of the respective ferrule. By protruding beyond the front face of the ferrule, the optical fibers of a pair of fiber optic connectors can be maintained in contact without requiring the ferrules to be in contact, thereby avoiding problems occasioned by imperfections in the ferrules. For example, the front face of a ferrule will typically include bumps or other imperfections which would limit or, in some extreme cases, prevent contact between the optical fibers of a pair of fiber optic connectors if the optical fibers did not protrude beyond the front face of the ferrule.

While it is desirable that the optical fibers of a fiber optic connector protrude beyond the front face of the ferrule, it has been difficult to fabricate fiber optic connectors having one or more optical fibers which protrude beyond the front face of the ferrule with conventional polishing methods and apparatus since such conventional polishing methods have been primarily designed to polish the front face of a connector and not to machine or etch the ferrule in order to allow the optical fibers to protrude therefrom. This deficiency in the conventional polishing methods and apparatus is particularly apparent in the fabrication of multi-fiber connectors since, in addition to merely protruding beyond the front face of the ferrule, it is desirable for the optical fibers of a multi-fiber connector to protrude by the same length beyond the front face of a ferrule. By protruding by the same length beyond the front face of the ferrule, the amount by which each optical fiber must deform in order to allow physical contact between each of the optical fibers is limited. Thus, while it has been difficult to fabricate fiber optic connectors which include optical fibers which protrude beyond the front face of the ferrule, it has been particularly difficult, if not impossible, to fabricate multi-fiber connectors which include a plurality of optical fibers which protrude beyond the front face of the ferrule by the same length. Instead, conventional fiber optic connectors include optical fibers which protrude beyond the front face of the fiber optic connector by different lengths, thereby requiring significant and undesirable deformation by at least some of the optical fibers in order to establish physical contact between the optical fibers.

SUMMARY OF THE INVENTION

It is therefore an object of the present invention to provide an improved polishing process and associated apparatus for fabricating fiber optic connectors having one or more optical fibers which protrude beyond the front face of the connector.

It is also an object of the present invention to provide a ferrule assembly having a ferrule and at least one optical fiber which extends beyond the front face of the ferrule by a preselected length.

It is a further object of the present invention to provide an improved method and apparatus for preferentially etching the front face of the ferrule of a fiber optic connector relative to the optical fibers such that the optical fibers protrude beyond the front face of the ferrule by a preselected length.

These and other objects are provided, according to one embodiment of the present invention, by a method and associated apparatus for polishing a ferrule assembly which polishes the front face of the ferrule with first and second slurries such that end portions of the at least one optical fiber which extends through and is held by the ferrule protrudes beyond the preferentially etched front face of the ferrule by a preselected length. According to this embodiment of the present invention, the front face of the ferrule is polished with a first slurry having a plurality of suspended particulates of a first predetermined size on average to initiate a preferential etch of the ferrule relative to each optical fiber. Thereafter, the front face of the ferrule is polished with a second slurry having a plurality of suspended particles of a second predetermined size on average. According to this advantageous embodiment, the slurries are selected such that the second predetermined size is less than the first predetermined size so that the polishing of the front face of the ferrule with the second slurry completes the preferential etch of the ferrule relative to each optical fiber. By preferentially etching the front face of the ferrule relative to each optical fiber, each optical fiber will protrude beyond the front face of the ferrule by a preselected length. Accordingly, fiber optic connectors incorporating the ferrule assembly of this embodiment of the present invention can align and establish physical contact between the respective optical fibers without significantly deforming the optical fibers, thereby increasing the optical transmission efficiency.

According to this advantageous embodiment of the present invention, the first and second slurries are supported on a polishing disc. In order to facilitate the preferential etch of the ferrule relative to the plurality of optical fibers, the ferrule assembly is preferably disposed within a polishing fixture which is biased toward the polishing disc, such as with a biasing means, while the ferrule assembly is polished. In one advantageous embodiment, the ferrule assembly is biased towards the polishing disc with a first predetermined force during the polishing of the ferrule with the first slurry, and is biased toward the polishing disc with a second predetermined bias force, less than the first predetermined bias force, during the polishing of the ferrule with the second slurry.

Following the polishing steps, the end portion of each optical fiber can be buffed to complete the fabrication process, if so desired. In order to properly buff the end portion of each optical fiber, the biasing means can include counterbalance means for counterbalancing at least a portion of the weight of the polishing fixture. According to this advantageous embodiment, counterbalance means includes a balance arm having first and second opposed ends and adapted to pivot about a medial portion thereof. The first end of the balance arm is preferably connected to the polishing fixture while the second end of the balance arm is connected to the counterbalance means, such as an adjustable weight placed upon the second end of the balance arm.

Prior to polishing the front face of the ferrule, at least one optical fiber is initially extended through and secured within a respective opening defined by the ferrule. The polishing method and apparatus of the present invention can then remove a portion of the front face of the ferrule to expose the end portion of each optical fiber prior to preferentially etching the ferrule relative to each optical fiber. During the removal of a portion of the front face of the ferrule, the front face of the ferrule can also be shaped to define a rearwardly extending angled portion, if desired.

According to another advantageous embodiment of the present invention, the method and associated apparatus includes rotation means for rotating the polishing disc about a polishing disc axis at a predetermined rotation rate and orbital means for simultaneously turning the polishing disc about an eccentric axis, offset from the polishing disc axis, at a predetermined orbit rate, so as to polish the ferrule assembly. According to this advantageous embodiment, the ratio of the predetermined orbit rate to the predetermined rotation rate is no greater than about 15 to 1 such that the ferrule is preferentially etched relative to each optical fiber to create a ferrule assembly in which the end portion of each optical fiber protrudes beyond the front face of the ferrule by a preselected length.

Therefore, the various embodiments of the present invention provide a method and an associated apparatus for polishing a ferrule assembly such that the front face of the ferrule is preferentially etched relative to each optical fiber. By preferentially etching the ferrule relative to the optical fibers according to the present invention, the end portion of each optical fiber will protrude beyond the front face of the ferrule by a preselected amount. Since the optical fibers of the resulting ferrule assembly protrude beyond the front face of the ferrule by a preselected length, a multi-fiber connector incorporating the ferrule assembly of one embodiment of the present invention can be more readily aligned and interconnected with other multi-fiber connectors so as to establish physical contact between the respective optical fibers of the aligned multi-fiber connectors without unnecessarily deforming the optical fibers, thereby increasing the efficiency with which signals are transmitted therebetween.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 1:
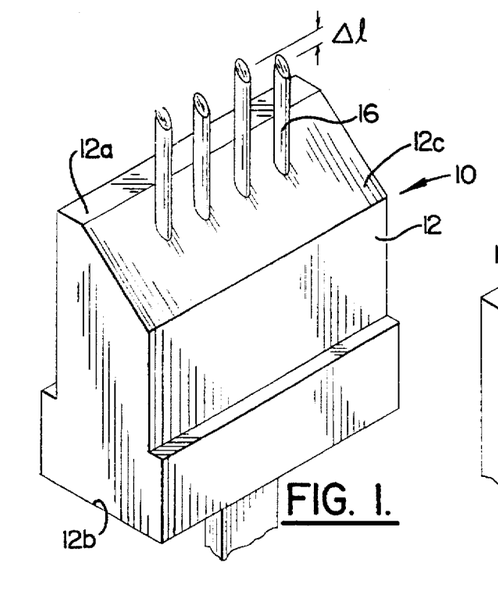
FIG. 1 is a perspective view of a ferrule assembly of the present invention having a ferrule and a plurality of optical fibers in which the optical fibers protrude beyond the preferentially etched front face of the ferrule by a preselected length.

As illustrated in FIG. 1, a ferrule assembly 10 of the present invention includes a ferrule 12 having a front face 12a and an opposed rear face 12b. Typically, the ferrule is formed of a resin and aggregate mixture. For example, the resin can be a thermosetting phenylic resin and the aggregate can be a silica aggregate. However, the ferrule can be formed of other types of resin and aggregate without departing from the spirit and scope of the present invention. In addition, the ferrule can be formed of different percentages of the resin and the aggregate. For example, in one advantageous embodiment, the ferrule is formed of 20% resin by weight and 80% aggregate by weight.

The ferrule 12 defines one or more openings 14 which extend between the opposed front and rear faces 12a and 12b, respectfully. While the ferrule illustrated and described herein is a multi-fiber ferrule which includes a plurality of openings, the ferrule can be a single fiber ferrule and, as a result, can define a single opening without departing from the spirit and scope of the present invention. Although not illustrated in FIG. 1, the ferrule can also define one or more guide pin openings for receiving respective guide pins for aligning the ferrule with the ferrule of another multi-fiber connector. See, for example, the U.S. Pat. No. 5,214,730 to Shinji Nagasawa et al. which issued May 25, 1993 and is assigned to Nippon Telegraph and Telephone Corporation.

Figure 8:
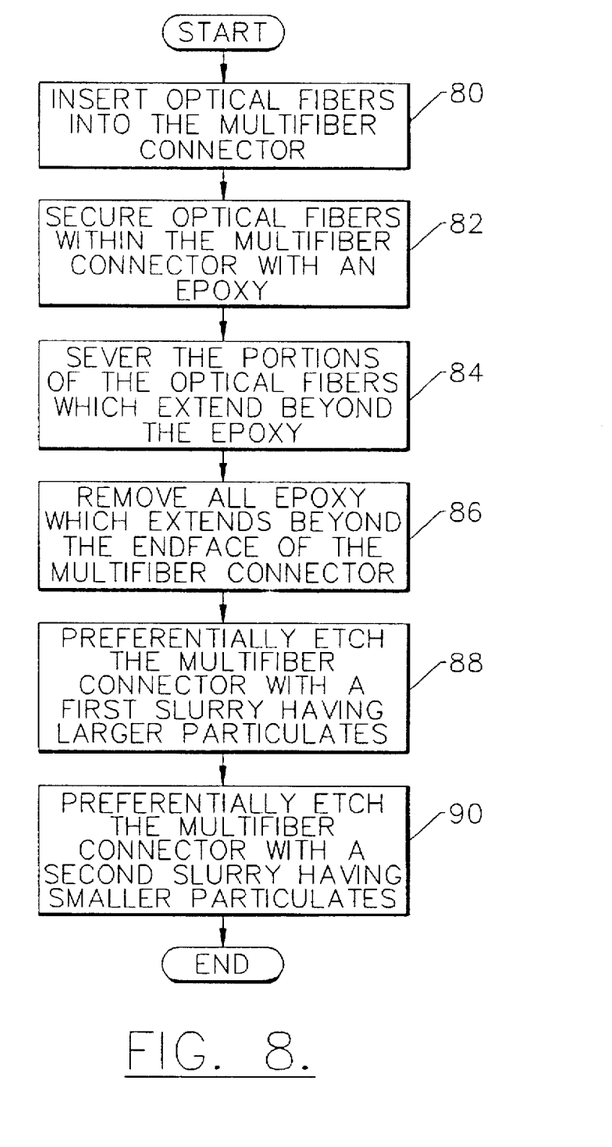
FIG. 8 is a flow chart of the operations performed by the polishing method and apparatus of the present invention.

The ferrule assembly 10 of the present invention can be incorporated within a fiber optic connector, such as a multi-fiber connector, and, as a result, also includes one or more optical fibers 16 which extend through respective ones of the openings 14 defined by ferrule 12 as indicated by block 80 of FIG. 8. The optical fibers can be of any desired size, but, in one embodiment, are about 125 μm in diameter. Irrespective of the size of the optical fibers, the openings defined by the ferrule through which the optical fibers extend are preferably slightly larger than the optical fibers, such as about 0.5 μm to about 2.5 μm larger in diameter than the optical fibers according to one advantageous embodiment.

Figure 2:
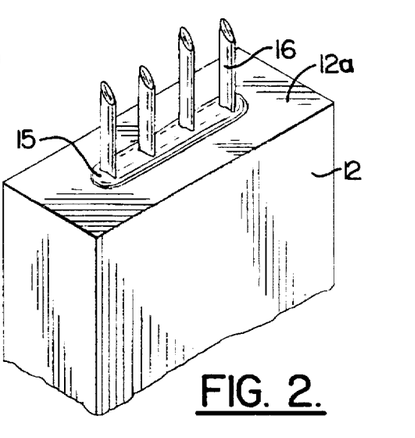
FIG. 2 is a perspective view of a ferrule assembly during the fabrication process of the present invention which illustrates the securing of the plurality of optical fibers within the respective openings defined by the ferrule, such as with an epoxy.

As shown in FIG. 2 and block 82 of FIG. 8, the optical fibers 16 are preferably secured within the respective openings 14 defined by the ferrule 12, such as with an epoxy and, more particularly, such as with EPOTEK™ 353 ND epoxy. As shown in FIG. 2, the respective end portions of the optical fibers extend beyond the front face 12a of the ferrule and at least a portion of the epoxy pools and solidifies upon the front face of the ferrule as designated by reference number 15 in FIG. 2. Thus, the polishing method of the present invention preferably removes a portion of the front face of the ferrule as shown in block 84 of FIG. 8 to thereby expose end portions of the optical fibers through the front face of the ferrule as shown in cross-section in FIG. 3. For example, a portion of the front face of the ferrule can be removed by grinding. Thus, during the step of removing a portion of the front face of the ferrule, the epoxy which has formed on the front face of the ferrule is also removed as shown in block 86 of FIG. 8. By removing at least a portion of the ferrule, the polishing method of the present invention can also expose end portions of those optical fibers which did not originally protrude beyond the front face of the ferrule. As also shown in FIG. 3, the polishing method can remove select portions of the front face of the ferrule to thereby define a rearwardly extending angled portion 12c, as described in more detail below.

Figures 3, 4, 5:
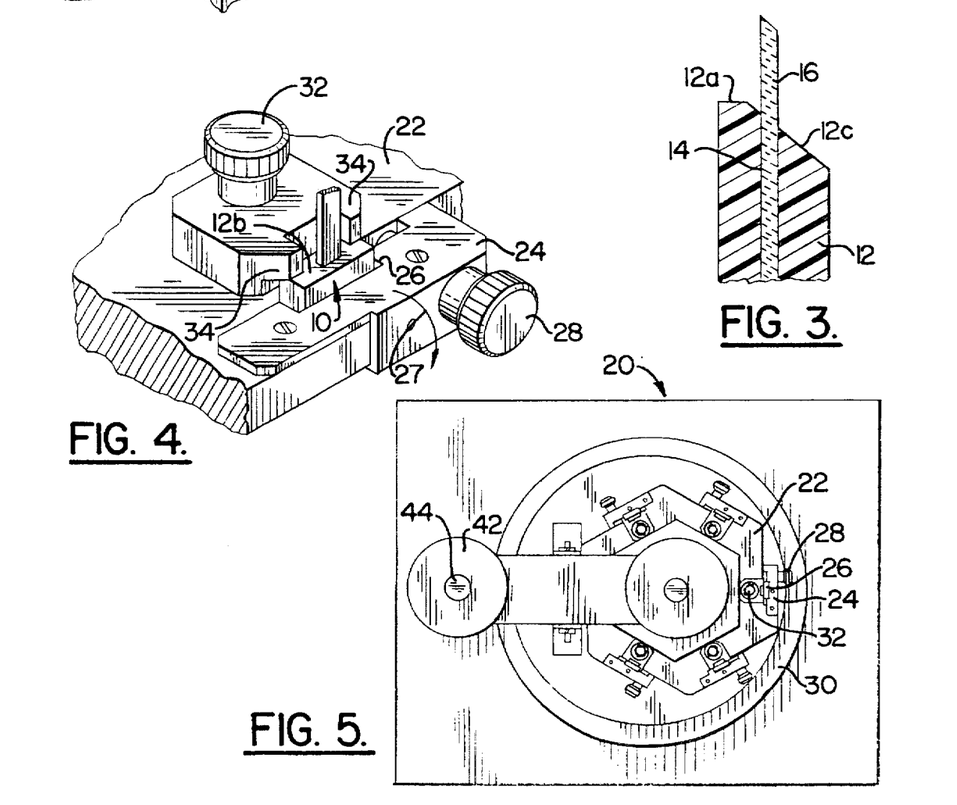
FIG. 3 is a cross-sectional view of a ferrule assembly during the fabrication process of the present invention which illustrates a ferrule having a front face which defines a rearwardly extending angled portion.
FIG. 4 is a perspective view of a portion of a polishing apparatus according to one embodiment of the present invention which includes a polishing fixture for securely retaining a ferrule assembly.
FIG. 5 is a top view of a polishing apparatus according to one embodiment of the present invention which illustrates a polishing fixture adapted to retain a plurality of ferrule assemblies.
Figure 6:
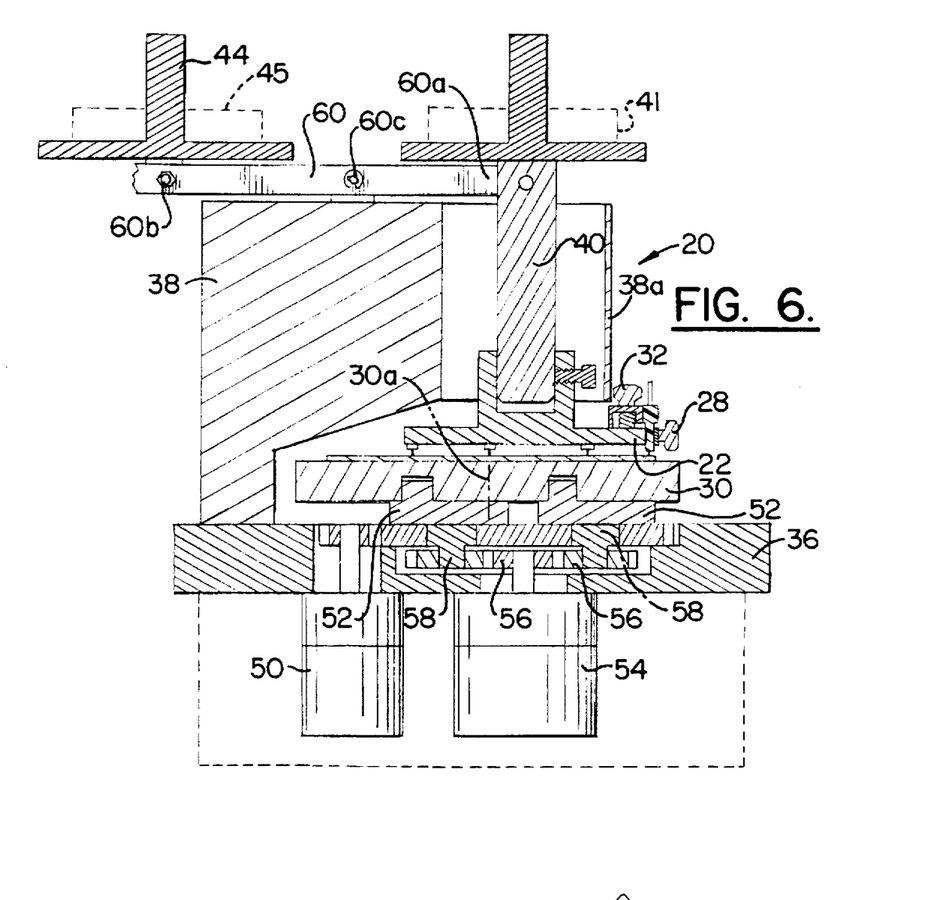
FIG. 6 is a cross-sectional view of the polishing apparatus of FIG. 5.

In order to remove a portion of the front face 12a of the ferrule 12 as well as to polish the ferrule assembly 10 as described hereinbelow, the ferrule assembly, including the ferrule and the optical fibers 16, is mounted within a polishing apparatus 20 as shown in FIGS. 4–6. According to one embodiment, the polishing apparatus includes a polishing fixture 22 for securely holding one or more ferrule assemblies. As shown in FIG. 5, the polishing fixture can simultaneously hold a plurality of ferrule assemblies. While the illustrated polishing fixture can hold six ferrule assemblies at one time, the polishing fixture can be adapted to hold any number of ferrule assemblies without departing from the spirit and scope of the present invention.

As shown in FIGS. 5 and 6 and, in more detail in FIG. 4, the polishing fixture 22 includes a number of ferrule retention arms 24 which, at least in part, define respective slots 26 for receiving and holding ferrule assemblies 10 of the present invention. In order to load a ferrule assembly into the polishing fixture, a ferrule retention arm is rotated from a closed position as shown in FIGS. 4–6 to an open position by moving the arm in the direction of arrow 27. Once in the open position, the ferrule assembly can be inserted within the respective slot and the ferrule retention arm can be closed about the ferrule assembly as shown in FIG. 4. The ferrule retention arm can then be latched in the closed position during the subsequent polishing operations, such as by threaded engagement of a latching member or thumbscrew 28 with the polishing fixture.

As shown in FIGS. 5 and 6, the polishing apparatus 20 also includes a polishing disc 30 positioned in a predetermined spaced relation to the polishing fixture 22. According to the present invention, the front face 12a of the ferrule 12 of each ferrule assembly 10 is preferably positioned in a predetermined spaced relation above the polishing disc. The polishing fixture 22 preferably includes means for adjusting the predetermined spacing of the ferrule to the polishing disc and, in one embodiment, can include an adjustment member or thumbscrew 32 and a pair of opposed arms 34 which engage the rear face 12b of the ferrule. The adjustment member is operatively connected to the pair of opposed arms such that by threadably adjusting the position of the adjustment member relative to the polishing fixture, the position of the pair of opposed arms and, in turn, the relative spacing of the front face of the ferrule to the polishing disc is adjusted.

Figure 7:
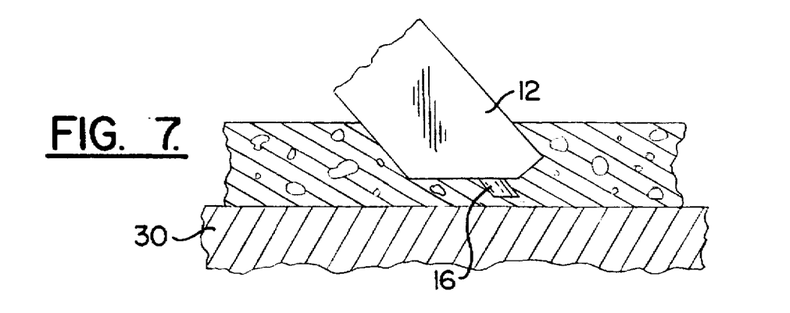
FIG. 7 is a greatly enlarged cross-sectional view illustrating the polishing of the front face of a ferrule with a slurry having a plurality of suspended particulates to thereby preferentially etch the front face of the ferrule relative to the optical fibers according to one embodiment of the present invention.

While the polishing fixture 22 illustrated in FIGS. 4 and 6 holds the ferrule 12 substantially perpendicular to the polishing disc 30, the polishing fixture can hold the ferrule at a predetermined angle, such as 82°, with respect to the polishing disc such that the polishing apparatus 20 removes select portions of the front face 12a of the ferrule to define the rearwardly extending angled portion 12c as shown in FIG. 7. By maintaining the ferrule assembly 10 at a predetermined angle relative to the polishing disc, as shown in FIG. 7, the polishing apparatus can also angle the end face of the optical fiber.

As shown in FIG. 6, the polishing apparatus 20 also includes a platform 36 which supports the polishing disc 30 and a support arm 38 which extends upwardly therefrom. The polishing apparatus also includes a shaft 40, such a vertically extending shaft as shown in FIG. 6, to connect the support arm and the polishing fixture 22. The shaft is connected to the polishing fixture, but is preferably adapted for movement relative to the support arm, such as vertical movement within a collar 38a defined by the support arm, so as to permit the spacing between the polishing fixture and the polishing disc to be controllably adjusted.

In order to appropriately machine the ferrule assembly 10, such as by polishing or grinding, the ferrule assembly must oftentimes be biased relative to the polishing disc 30. Thus, the polishing apparatus 20 can include biasing means for biasing the polishing fixture 22 and, in turn, the ferrule assembly relative to the polishing disc. Typically, the biasing means biases the polishing fixture toward the polishing disc, such as during the polishing operations described hereinafter. However, in order to buff the end portions of the optical fibers 16 as described below, the biasing means may counterbalance or offset the weight of the shaft 40 and the polishing fixture. Accordingly, the biasing means of the polishing apparatus of this embodiment of the present invention preferably includes counterbalance means as described below.

Figure 6A:
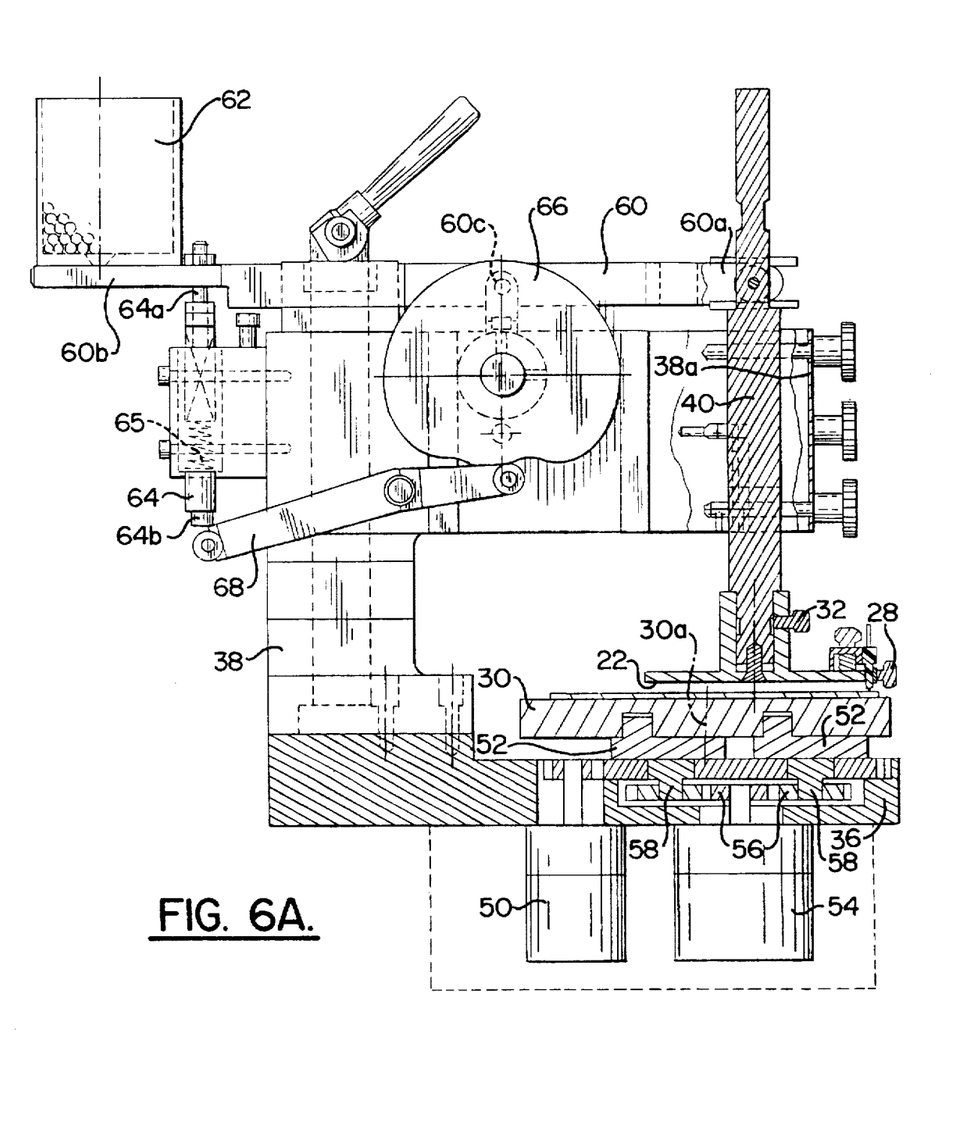
FIG. 6A is a fragmentary cross-sectional view of the polishing apparatus of an alternative embodiment of the present invention which illustrates a cam-actuated balance arm for imposing a bias force upon the ferrule assembly.

Typically, the biasing means includes a balance arm 60 having first and second opposed ends 60a and 60b, respectively. As shown in FIGS. 6 and 6A, a medial portion 60c of the balance arm is preferably pivotally connected to upper portions of the support arm 38. As also shown in FIGS. 6 and 6A, the first end of the balance arm is operatively connected to the polishing fixture 22 and, more typically, is connected to upper portions of the vertically extending shaft 40. As explained hereinbelow, the second end of the balance arm is preferably operatively connected to the counterbalance means.

In the embodiment of FIGS. 5 and 6, the biasing means can include one or more weights 41 which are placed on upper portions of the vertically extending shaft 40. By placing weights upon the shaft, the shaft is urged downward and the polishing fixture 22 is, in turn, urged closer to the polishing disc 30. As also shown, the counterbalance means of this embodiment can also include a rod 44 which extends upwardly from the second end 60b of the balance arm 60 on which one or more weights 45 can be placed. By placing a predetermined amount of weight upon the second end of the balance arm, such as during buffing operations, the weight will at least partially counterbalance or offset the downwardly acting bias force exerted by the weight of the polishing fixture and the vertically extended shaft as well as any weight 41 supported by the shaft by urging the shaft upwardly, thereby increasing the space between the polishing disc and the polishing fixture.

Figure 6B:
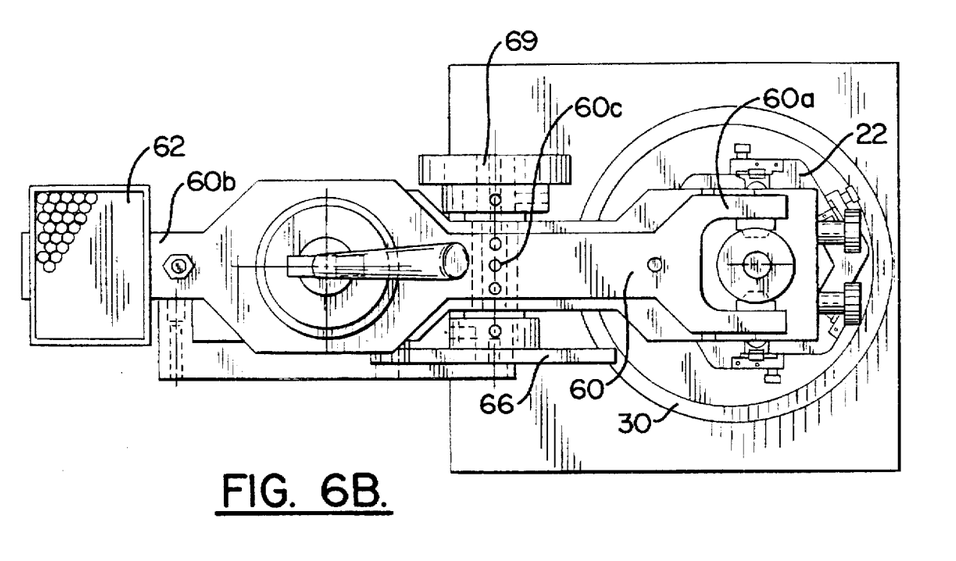
FIG. 6B is a top view of the embodiment of the polishing apparatus shown in FIG. 6A.

Alternatively, as shown in FIGS. 6A and 6B, the counterbalance means can include a fixed weight 62 supported by the second end 60b of the balance arm 60. The fixed weight supported by the second end of the balance arm also seems to at least partially counterbalance or offset the downwardly acting bias force exerted by the weight of the polishing fixture and the vertically extended shaft by urging the shaft upwardly, thereby increasing the space between the polishing disc and the polishing fixture. As shown in FIGS. 6A and 6B, the position of the second end of the balance arm and, in turn, the relative position of the polishing fixture 22 can be adjusted by means of a cam-actuated piston assembly. As shown in FIG. 6A, the piston assembly includes a piston 64 having a first end 64a which contacts the second end of the balance arm and at least partially supports the second end of the balance arm.

According to this embodiment, the relative position of the piston 64 and, correspondingly, the relative position of the second end 60b of the balance arm 60 is adjusted by a combination of an eccentric cam 68 and a pivot arm 68 which extends between the cam and a second end 64b of the piston. As shown, both the cam and the pivot arm are attached to the support arm 38. Thus, by rotating the cam, a spring 65 is compressed, thereby controllably adjusting the inclination of the pivot arm and, in turn, the relative position of the piston. By controllably adjusting the relative position of the piston, the position of the balance arm and, in turn, the relative position of the polishing fixture 22 with respect to the underlying polishing disc 30 can also be controllably adjusted.

The position of the cam 66 of this embodiment of the biasing means can be adjusted in a variety of manners as known to those skilled in the art. However, as shown in FIG. 6B, the cam can be connected, such as via a shaft which extends through the support arm 38 to a knurled knob 66 which is rotatably connected to the support arm and can be rotated by the operator to position the cam as desired relative to the pivot arm 68 which rides thereon. While two embodiments of the biasing means are illustrated, the biasing means can urge the ferrule assembly 10 toward the polishing disc 30 in other manners without departing from the spirit and scope of the present invention.

Figure 5A:
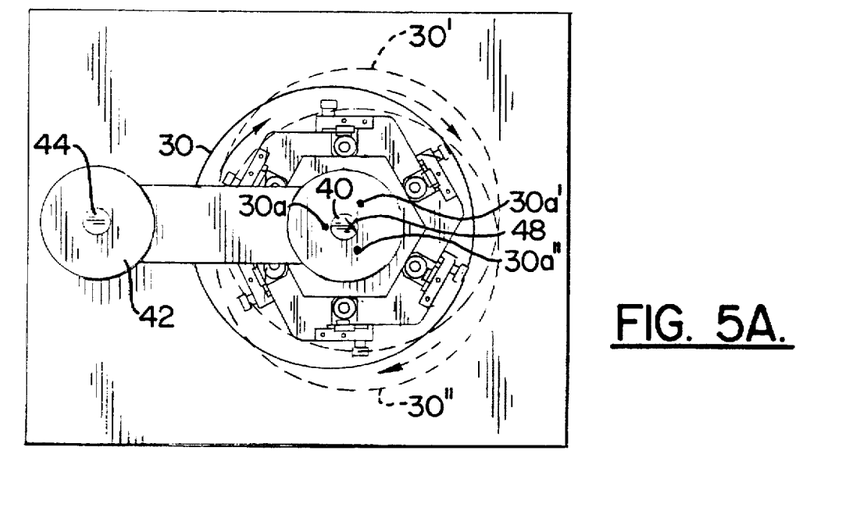
FIG. 5A is a schematic top view of the polishing apparatus of FIG. 5 illustrating the simultaneous rotation and orbiting of the polishing disc relative to the polishing fixture.

As shown in FIG. 6, the polishing apparatus 20 includes rotation means for rotating the polishing disc 30 about the polishing disc axis 30a defined thereby. As shown in FIGS. 5A and 6 and as described by the Takahashi '334 patent, the polishing disc is also adapted to be simultaneously turned about an eccentric axis 48, offset from the polishing disc axis, such that the polishing disc not only rotates, but also orbits during polishing operations.

As shown in FIG. 6 and as described by the Takahashi '334 patent, the contents of which are incorporated herein by reference, the rotation means can include a motor 50 which is operatively coupled to a support disc 52 such that the motor can rotate the support disc. As shown, the polishing disc 30 is disposed upon the support disc such that rotation of the support disc by the motor rotates the polishing disc about the polishing disc axis 30a. Preferably, the rotation means rotates the polishing disc at a predetermined rotation rate, such as twelve revolutions per minute (RPM).

As also shown in FIG. 6 and described by the Takahashi '334 patent, the polishing disc is also supported by a plurality of eccentric discs 52. The polishing apparatus 20 of this embodiment also includes orbiting means, such as a motor 54, for turning each of the eccentric discs. In particular, the orbiting means can drive a set of planetary gears 56 which engage the eccentric discs and, more particularly, the axle sections 58 of each of the eccentric discs. Although not illustrated, the rotation means and the orbiting means can share a single motor having a rotary output which is divided by means of an appropriate gearing arrangement to provide both the rotation and the orbiting of the polishing disc.

By turning the eccentric discs 52, the orbiting means effectively turns the polishing disc about an eccentric axis 48, offset from the polishing disc axis 30a, such that the polishing disc both rotates and orbits relative to the polishing fixture. For example, the position and movement of the polishing disc relative to the fixed polishing fixture 22 is shown at three different times by FIG. 5A. At a first time, the polishing disc 30 is in a first position relative to the polishing fixture as shown in solid lines in FIG. 5A. Following turning of the eccentric discs 52 by the orbital means, the polishing disc is in a second position relative to the polishing fixture as shown in dashed lines and designated 30' in FIG. 5A. Following additional turning of the eccentric discs 52 by the orbital means, the polishing disc is in a third position relative to the polishing fixture as shown in dashed lines and designated 30" in FIG. 5A. Thus, the polishing disc effectively orbits about the eccentric axis 48 during the polishing operations. Simultaneous with the orbiting of the polishing disc, the rotation means continues to rotate the polishing disc about the polishing disc axis designated 30a, 30a' and 30" in the first, second and third positions, respectively.

In operation and once the ferrule assemblies 10 have been secured within the polishing fixture 22, the polishing disc 30 can be rotated and orbited in order to machine the front face 12a of the ferrule 12 as desired. For example, in order to remove a portion of the front face of the ferrule so as to expose end portions of optical fibers 16, sandpaper is mounted upon the polishing disc and the ferrule is biased into contact with the sandpaper. Thus, upon subsequent rotation and orbiting of the polishing disc, selected portions of the front face of the ferrule are removed to expose end portions of each of the optical fibers. In addition, by angling the ferrule relative to the polishing disc, the front face of the ferrule can be machined so as to define a rearwardly extending angled portion 12c as shown in FIG. 3 and as described above.

Once the end portions of the plurality of optical fibers 16 have been exposed through the front face 12a of the ferrule 12, the front face of the ferrule is polished with a first slurry as shown in FIG. 7 and in block 88 of FIG. 8. According to the present invention, the first slurry has a plurality of suspended particulates of a first predetermined size on average which initiate a preferential etch of the ferrule relative to the optical fibers. In particular, the polishing apparatus 20 of present invention rotates the polishing disc 30 about the polishing disc axis 30a and turns the polishing disc about the eccentric axis 48 in order to polish the front face of the ferrule with the first slurry supported by the polishing disc. Thereafter, the first slurry is removed from the polishing disc and a second slurry is applied to the polishing disc. The second slurry has a plurality of suspended particulates of a second predetermined size on average, less the first predetermined size of the suspended particulates of the first slurry. As described above and as illustrated in block 90 of FIG. 8, the polishing apparatus preferably rotates the polishing disc about the polishing disc axis while simultaneously turning the polishing disc about the eccentric axis in order to polish of the front face of the ferrule with the second slurry.

By rotating the polishing disc 30 about the polishing disc axis 38a and by simultaneously turning the polishing disc about an eccentric axis 48, offset from the polishing disc axis, the polishing method and apparatus of the present invention polishes the front face 12a of the ferrule 12 in a more even and consistent manner. In particular, the polishing method and apparatus of the present invention significantly diminishes the effect of any imperfections on the surface of the polishing disc by continually altering, both radially and angularly, the portion of the polishing disc with which the front face of the ferrule is in contact.

According to one advantageous embodiment, the polishing apparatus 20 rotates the polishing disc 30 about the polishing disc axis 30a at a predetermined rotation rate and turns the polishing disc about the eccentric axis 48 at a predetermined orbit rate. According to one advantageous embodiment, the ratio of the predetermined orbit rate to the predetermined rotation rate is no greater than about 15 to 1. By maintaining the ratio of the predetermined orbit rate to the predetermined rotation rate no greater than about 15 to 1, the polishing method and apparatus of the present invention preferentially etches the ferrule 12 relative to the optical fibers 16 in a controlled manner such that the respective end portions of the optical fibers protrude beyond the preferentially etched front face 12a of the ferrule by a preselected length. For example, in one particularly advantageous embodiment, the predetermined rotation rate is between about 9 rpm and 15 rpm and, more preferably, is about 12 rpm, and the predetermined orbit rate between about 90 rpm and 180 rpm and, more preferably, is about 144 rpm.

As described above, the first slurry has a plurality of suspended particulates of a first predetermined size on average. Likewise, the second slurry has a plurality of suspended particulates of a second predetermined size on average, less than a first predetermined size. By decreasing the size of the particulates suspended within the slurries during the polishing method of the present invention, the first slurry can initiate a preferential etch of the ferrule 12 relative to the optical fibers 16 and the second slurry can complete the preferential etch of the ferrule relative the optical fibers such that the respective end portions of the optical fibers protrude beyond the preferentially etched front face 12a of the ferrule by a preselected length, such as a preselected length of greater than about 0.5 microns or, most commonly, between about 0.5 microns and about 2.5 microns. Thus, for an optical fiber having a diameter of about 125 microns, the respective end portion of the optical fiber preferably protrudes beyond the preferentially etched front face of the ferrule by a preselected length which is between about 0.4% and about 2% of the diameter of the optical fiber. In this regard, it is noted that the relative lengths by which the optical fibers protrude beyond the front face of the ferrule of FIGS. 1-3 and 7 are greatly exaggerated for purposes of clarity and illustration.

In particular, it is believed that the polishing of the front face 12a of the ferrule 12 with a first slurry having larger particulates removes the majority of the phenylic resin and rounds the aggregate particles which form the ferrule. In addition, the polishing with the first slurry also tends to round the end portions of the optical fibers 16. Thereafter, the polishing of the front face of the ferrule with the second slurry having smaller particulates removes the rounded aggregate particles since the smaller particulates can engage and cut the rounded aggregate more readily.

Although a variety of first and second slurries can be employed without departing from the spirit and scope of the present invention, the first slurry preferably includes suspended particulates which are larger by at least 0.5 microns on average and, more preferably, about 1 micron on average than the particulates suspended within the second slurry. For example, the particulates suspended within the first and second slurries can have an average predetermined size of about 2 microns and about 1 micron, respectively. In addition, the suspended particulates can be formed of a variety of materials, such as aluminum oxide, silica carbide, diamond or cubic boron nitride, without departing from the spirit and scope of the present invention.

During the polishing steps, the ferrule assembly 10 is preferably biased toward the polishing disc 30 to facilitate the preferential etch of the ferrule 12 relative to the optical fibers 16. For example, the ferrule assembly can be biased toward the polishing disc with a first predetermined bias force while the front face 12a of the ferrule is polished with the first slurry and can be biased toward the polishing disc with a second predetermined bias force while the front face of the ferrule is polished with the second slurry. Preferably, the second predetermined bias force is less than the first predetermined bias force. For example, the front face of the ferrule can be polished with the first slurry for a predetermined time period, such as 2 minutes, while the ferrule assembly is biased toward the polishing disc with a first predetermined bias force of 5 kilograms. Thereafter, the front face of the ferrule can be polished with a second slurry for a predetermined time period, such as 2 minutes, while the ferrule assembly is biased toward the polishing disc with a second predetermined bias force of 3 kilograms. The length of time during which the ferrule is polished and the bias force under which the ferrule is polished can be varied, however, without departing from the spirit and scope of the present invention.

During the polishing step, the first and second slurries preferentially etch the front face 12a of the ferrule 12 relative to the optical fibers 16 as shown in FIG. 7. Thus, following the polishing of the ferrule assembly 10, the optical fibers protrude beyond the preferentially etched front face of the ferrule by a preselected length. As shown in FIG. 1, a multi-fiber ferrule assembly can be fabricated according to the method and apparatus of the present invention which includes a plurality of optical fibers which protrude beyond the front face of the ferrule by a length which varies only slightly. For example, the optical fibers of a multi-fiber ferrule assembly of the present invention typically have a difference in length $\Delta l$ of less than 0.4 microns and, more typically, less than 0.2 microns. In this regard, it is noted that the differences in length between the optical fibers of the exemplary ferrule assembly of FIGS. 1 and 2 are greatly exaggerated for purposes of clarity and illustration. Due to these slight differences in length, however, a multi-fiber connector incorporating the ferrule assembly of this embodiment of the present invention can be readily aligned and interconnected with another multi-fiber connector since the plurality of optical fibers protrude beyond the front face of the ferrule by approximately the same length so as to contact respective optical fibers of the other multi-fiber connector without requiring one or more of the optical fibers to deform excessively.

Although not typically required, the polishing method of the present invention can include the step of buffing the end portions of the optical fibers 16 once the ferrule assembly 10 has been polished with the first and second slurries. In order to buff the end portions of the optical fibers, sandpaper of a fine grade, such as 0.05 micron, is mounted on the polishing disc 30 which is thereafter both rotated about the polishing disc axis 30a and turned about the eccentric axis 48 as described above. In order to buff the end portions of the optical fibers without removing a significant portion of the optical fibers, the weight of the polishing fixture 22 and the vertically extending shaft 40 is preferably counterbalanced by placing weight on the upwardly extending rod 44 of the counterbalance member 42, thereby reducing the bias force placed upon the ferrule assembly. Once the end portions of the optical fibers have been buffed, the ferrule assembly can be removed from the polishing fixture and can be incorporated within a respective multi-fiber connector.

Therefore, the various embodiments of the present invention provide a method and an associated apparatus for polishing a ferrule assembly 10 such that the front face 12a of the ferrule 12 is preferentially etched relative to the optical fibers 16. By preferentially etching the ferrule relative to the optical fibers according to the present invention, the end portions of the optical fibers will protrude beyond the front face of the ferrule by a preselected amount. Since the optical fibers of the resulting ferrule assembly protrude beyond the front face of the ferrule by a preselected length, a multi-fiber connector incorporating the ferrule assembly of one embodiment of the present invention can be more readily aligned and interconnected with other multi-fiber connectors so as to establish physical contact between the respective optical fibers of the aligned multi-fiber connectors without significantly deforming the optical fibers, thereby increasing the efficiency with which signals are transmitted therebetween.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:

1. A method of polishing a ferrule assembly comprising the steps of:

providing a ferrule assembly comprising a ferrule having a front face and an opposed rear face and defining at least one opening extending between the opposed front and rear faces, the ferrule assembly further comprising at least one optical fiber extending through a respective opening such that end portion of each optical fiber is exposed through the front face of the ferrule;

polishing the front face of the ferrule with a first slurry having a plurality of suspended particulates of a first predetermined size on average to initiate a preferential etch of the ferrule relative to each optical fiber; and thereafter polishing the front face of the ferrule with a second slurry having a plurality of suspended particulates of a second predetermined size on average, wherein the second predetermined size is less than the first predetermined size such that said step of polishing the front face of the ferrule with the second slurry completes the preferential etch of the ferrule relative to each optical fiber such that the end portion of each optical fiber protrudes beyond the preferentially etched front face of the ferrule by a preselected length.

2. A method according to claim 1 further comprising the steps of:

supporting the first slurry on a polishing disc during said step of polishing the front face of the ferrule with the first slurry and supporting the second slurry on the polishing disc during said step of polishing the front face of the ferrule with the second slurry; and biasing the ferrule assembly toward the polishing disc during both of said polishing steps to facilitate the preferential etch of the ferrule relative to the plurality of optical fibers.

3. A method according to claim 2 wherein said biasing step comprises the steps of:
   biasing the ferrule assembly toward the polishing disc with a first predetermined bias force during said step of polishing the front face of the ferrule with the first slurry; and
   biasing the ferrule assembly toward the polishing disc with a second predetermined bias force, less than the first predetermined bias force, during said step of polishing the front face of the ferrule with the second slurry.

4. A method according to claim 1 further comprising the step of buffing the end portion of each optical fiber following said step of polishing the front face of the ferrule with the second slurry.

5. A method according to claim 1 wherein said providing step comprises the steps of:
   extending at least one optical fiber through a respective opening defined by the ferrule;
   securing each optical fiber within the respective opening defined by the ferrule; and
   removing a portion of the front face of the ferrule to thereby expose an end portion of each optical fiber through the front face of the ferrule.

6. A method according to claim 5 wherein said removing step comprises the step of removing selected portions of the front face of the ferrule to define a rearwardly extending angled portion.

7. A ferrule assembly comprising a ferrule having a front face and an opposed rear face and defining at least one opening extending between the opposed front and rear faces, wherein the ferrule assembly further comprises at least one optical fiber extending through a respective opening such that an end portion of each optical fiber protrudes beyond the front face of the ferrule by a preselected length, and wherein the ferrule assembly is manufactured according to a polishing method comprising the steps of:
   polishing the front face of the ferrule with a first slurry having a plurality of suspended particulates of a first predetermined size on average to initiate a preferential etch of the ferrule relative to each optical fiber; and
   thereafter polishing the front face of the ferrule with a second slurry having a plurality of suspended particulates of a second predetermined size on average, wherein the second predetermined size is less than the first predetermined size such that said step of polishing the front face of the ferrule with the second slurry completes the preferential etch of the ferrule relative to each optical fiber such that the end portion of each optical fiber protrudes beyond the preferentially etched front face of the ferrule by the preselected length.

8. A ferrule assembly manufactured according to claim 7 further comprising the steps of:
   supporting the first slurry on a polishing disc during said step of polishing the front face of the ferrule with the first slurry and supporting the second slurry on the polishing disc during said step of polishing the front face of the ferrule with the second slurry; and
   biasing the ferrule assembly toward the polishing disc during both of said polishing steps to facilitate the preferential etch of the ferrule relative to each optical fiber.

9. A ferrule assembly manufactured according to claim 8 wherein said biasing step comprises the steps of:
   biasing the ferrule assembly toward the polishing disc with a first predetermined bias force during said step of polishing the front face of the ferrule with the first slurry; and
   biasing the ferrule assembly toward the polishing disc with a second predetermined bias force, less than the first predetermined bias force, during said step of polishing the front face of the ferrule with the second slurry.

10. A ferrule assembly manufactured according to claim 7 further comprising the step of buffing the end portion of each optical fiber following said step of polishing the front face of the ferrule with the second slurry.

11. A ferrule assembly manufactured according to claim 7 further comprising the steps of:
   extending at least one optical fiber through a respective opening defined by the ferrule;
   securing each optical fiber within the respective opening defined by the ferrule; and
   removing a portion of the front face of the ferrule to thereby expose an end portion of each optical fiber through the front face of the ferrule.

12. A ferrule assembly manufactured according to claim 11 wherein said removing step comprises the step of removing selected portions of the front face of the ferrule to define a rearwardly extending angled portion.

13. A method of polishing a ferrule assembly comprising the steps of:
   providing a ferrule assembly comprising a ferrule having a front face and an opposed rear face and defining at least one opening extending between the opposed front and rear faces, the ferrule assembly further comprising at least one optical fiber extending through a respective opening such that an end portion of each optical fiber is exposed through the front face of the ferrule; and
   polishing the front face of the ferrule with a slurry to preferentially etch the ferrule relative to each optical fiber, wherein said polishing step comprises the steps of:
   supporting the slurry on a polishing disc having a polishing disc axis;
   rotating the polishing disc about the polishing disc axis at a predetermined rotation rate; and
   turning the polishing disc about an eccentric axis, offset from the polishing disc axis, simultaneous with said rotating step such that the polishing disc orbits about the eccentric axis at a predetermined orbit rate, wherein the ratio of the predetermined orbit rate to the predetermined rotation rate is no greater than about fifteen to one to thereby preferentially etch the ferrule relative to each optical fiber such that an end portion of each optical fiber protrudes beyond the preferentially etched front face of the ferrule by a preselected length.

14. A method according to claim 13 further comprising the step of offsetting at least a portion of the weight of a polishing fixture for positioning the front face of the ferrule in contact with the slurry supported by said polishing disc during said polishing step to facilitate the preferential etch of the ferrule relative to the plurality of optical fibers.

15. A method of polishing a ferrule assembly comprising the steps of:
   providing a ferrule assembly comprising a ferrule having a front face and an opposed rear face and defining at least one opening extending between the opposed front and rear faces, the ferrule assembly further comprising at least one optical fiber extending through a respective opening such that an end portion of each optical fiber is exposed through the front face of the ferrule;
   polishing the front face of the ferrule with a slurry to preferentially etch the ferrule relative to each optical fiber, wherein said polishing step comprises the steps of:

supporting the slurry on a polishing disc having a polishing disc axis;

rotating the polishing disc about the polishing disc axis at a predetermined rotation rate; and turning the polishing disc about an eccentric axis, offset from the polishing disc axis, simultaneous with said rotating step such that the polishing disc orbits about the eccentric axis at a predetermined orbit rate, wherein the ratio of the predetermined orbit rate to the predetermined rotation rate is no greater than about fifteen to one to thereby preferentially etch the ferrule relative to each optical fiber such that an end portion of each optical fiber protrudes beyond the preferentially etched front face of the ferrule by a preselected length; and buffing the end portion of each optical fiber following said polishing step.

16. An apparatus for polishing a ferrule assembly comprising at least one optical fiber and a ferrule having a front face and an opposed rear face and defining at least one opening extending between the opposed front and rear faces, wherein each optical fiber extends through a respective opening such that an end portion of each optical fiber is exposed through the front face of the ferrule, the polishing apparatus comprising:

a polishing disc having a polishing disc axis for supporting a slurry;

a polishing fixture for positioning the front face of the ferrule in contact with the slurry supported by said polishing disc;

rotation means in operative engagement with said polishing disc for rotating the polishing disc about the polishing disc axis at a predetermined rotation rate; and orbital means in operative engagement with said polishing disc for turning the polishing disc about an eccentric axis, offset from the polishing disc axis, simultaneous with the rotation of the polishing disc such that the polishing disc orbits about the eccentric axis at a predetermined orbit rate, wherein the ratio of the predetermined orbit rate to the predetermined rotation rate is no greater than about fifteen to one to thereby preferentially etch the ferrule relative to the at least one optical fiber such that an end portion of each optical fiber protrudes beyond the preferentially etched front face of the ferrule by a preselected length.

17. An apparatus according to claim 16 further comprising offsetting means in operative engagement with said polishing fixture for at least partially offsetting the downwardly acting bias force exerted by the weight of the polishing fixture to facilitate the preferential etch of the ferrule relative to the at least one optical fiber.

18. An apparatus for polishing a ferrule assembly comprising at least one optical fiber and a ferrule having a front face and an opposed rear face and defining at least one opening extending between the opposed front and rear faces, wherein each optical fiber extends through a respective opening such that an end portion of each optical fiber is exposed through the front face of the ferrule, the polishing apparatus comprising:

a polishing disc having a polishing disc axis for supporting a slurry;

a polishing fixture for positioning the front face of the ferrule in contact with the slurry supported by said polishing disc;

biasing means in operative engagement with said polishing fixture for biasing the ferrule assembly relative to said polishing disc, wherein said biasing means comprises offsetting means for offsetting at least a portion of the weight of said polishing fixture; and rotation means in operative engagement with said polishing disc for rotating the polishing disc about the polishing disc axis to thereby controllably polish the front face of the ferrule.

19. An apparatus according to claim 18 wherein said biasing means comprises a balance arm having first and second opposed ends and adapted to pivot about a medial portion thereof, wherein the first end of said balance arm is operatively connected to said polishing fixture, and wherein the second end of said balance arm is operatively connected to said offsetting means.

20. An apparatus according to claim 19 wherein said offsetting means comprises an adjustable weight placed upon the second end of said balance arm.

21. A ferrule assembly comprising:

a ferrule having a front face and an opposed rear face and defining a plurality of openings extending between the opposed front and rear faces; and a plurality of optical fibers extending through respective ones of the openings defined by said ferrule, wherein each optical fiber has an end portion which protrudes beyond the front face of the ferrule by a preselected length which varies by no more than about 0.4 microns from the preselected length by which the respective end portions of each of the other optical fibers protrude beyond the front face of the ferrule.

22. A ferrule assembly according to claim 21 wherein the end portion of each optical fiber protrudes beyond the front face of the ferrule by a preselected length of between about 0.5 microns and about 2.5 microns.

23. A ferrule assembly according to claim 21 wherein each optical fiber has a predetermined diameter, and wherein the end portion of each optical fiber protrudes beyond the front face of the ferrule by a preselected length of between about 0.4% of the diameter of the respective optical fiber and about 2.5% of the diameter of the respective optical fiber.

* * * * *